March 31, 1936.   J. S. FEINS   2,036,030
AUTOMOBILE SANDING DEVICE
Filed Aug. 25, 1934   2 Sheets-Sheet 1

Inventor
Joseph S. Feins
By Miller & Miller
Attorneys

March 31, 1936.                J. S. FEINS                2,036,030
                        AUTOMOBILE SANDING DEVICE
                         Filed Aug. 25, 1934              2 Sheets-Sheet 2
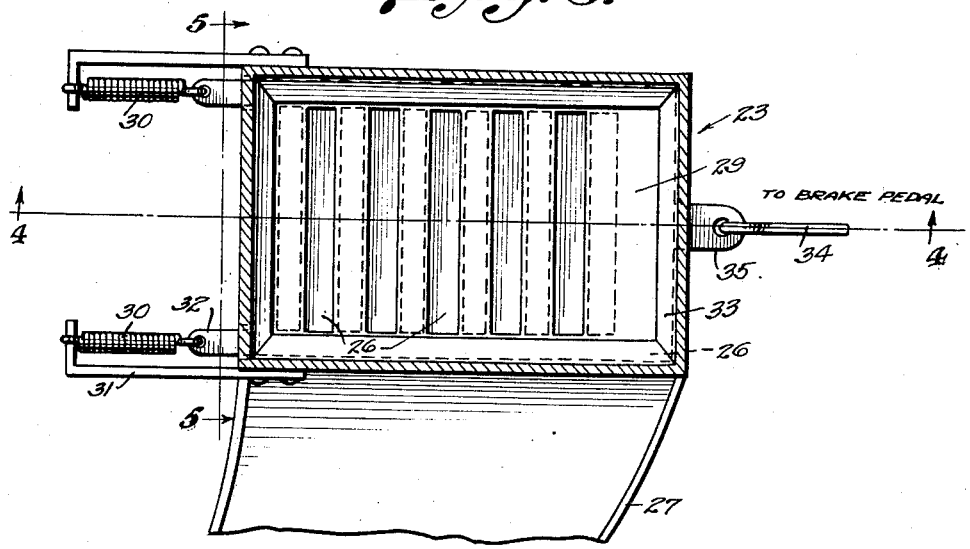
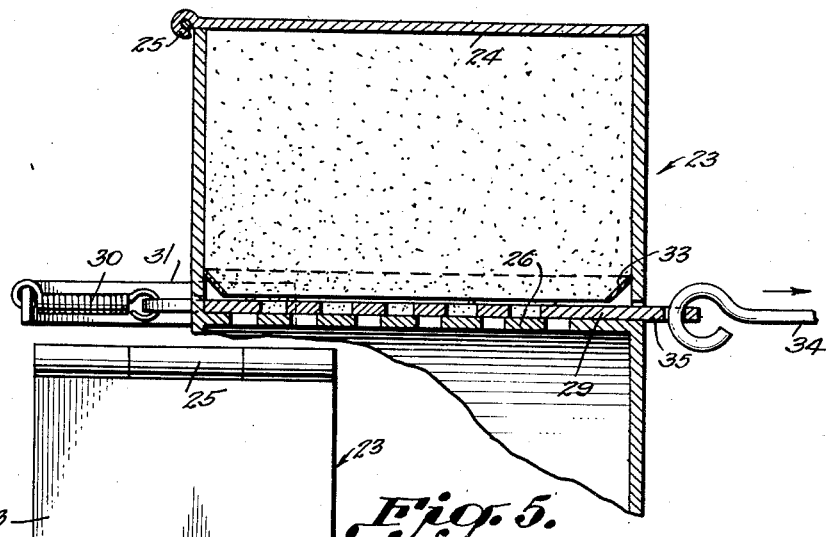
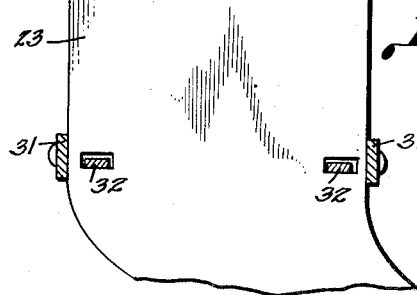
Inventor
Joseph S. Feins Patented Mar. 31, 1936

2,036,030

UNITED STATES PATENT OFFICE 2,036,030

AUTOMOBILE SANDING DEVICE

Joseph S. Feins, New York, N. Y., assignor of one-fourth to Pauline Sadofsky, New York, N. Y.

Application August 25, 1934, Serial No. 741,481

1 Claim. (Cl. 291—15)

This invention relates to an automobile sanding device and has for an object to provide an improved means of preventing skidding of an automobile.

A further object of this invention is to provide an automobile sanding device that may be connected up with either the foot or the hand brake operating means whenever desired so as to automatically discharge sand beneath the wheels of the automobile while the foot or hand brake is being operated.

A further object of this invention is the provision of means for supplying sand beneath each rear tire or wheel of the automobile, which means will be temporarily connected to the brake means during wet or snowy weather so as to automatically discharge the sand beneath the wheels every time the brake is operated.

A further object of this invention is to provide an automobile sanding device including a separate source of supply of sand for each rear automobile tire, wherein each source of supply will be made preferably of aluminum so that it may be light in weight and non-rusting and will be secured to the chassis of the automobile by steel straps in the same manner as a battery box is fixed thereto.

Figure 1:
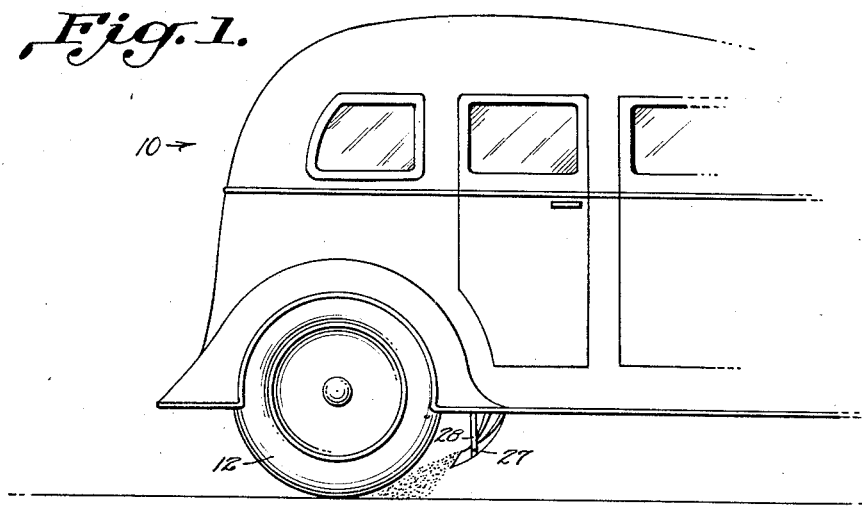
Figure 2:
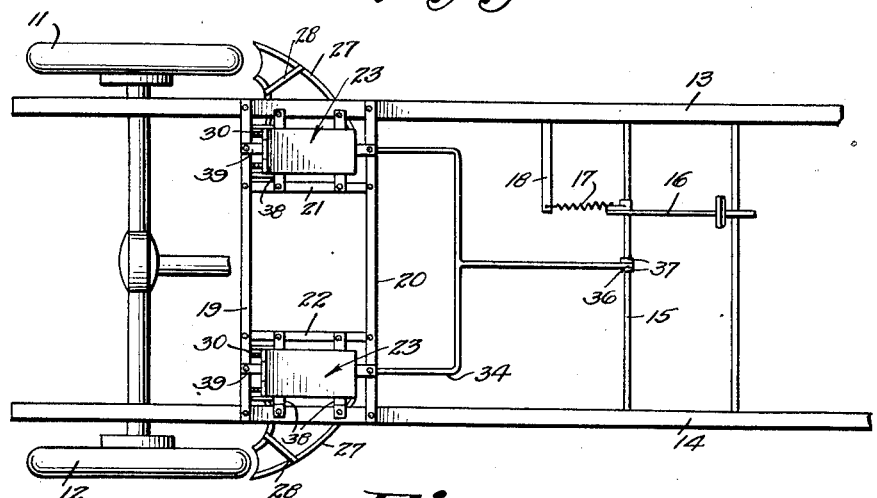
Figure 6:
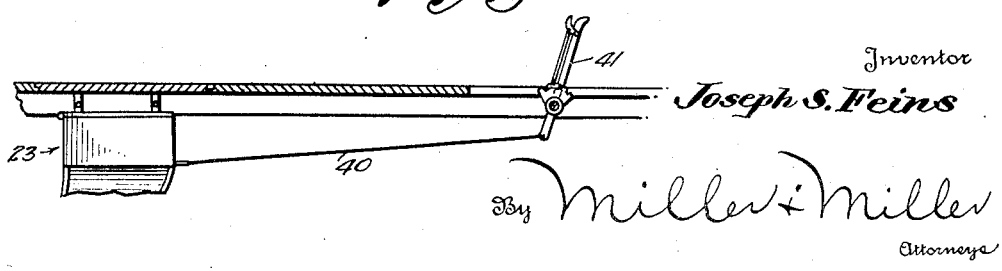

With the foregoing and other objects in view, as will hereinafter become apparent, this invention comprises the constructions, combinations, and arrangements of parts, hereinafter set forth, disclosed and shown on the accompanying drawings. In the drawings, Figure 1 is a side elevation of the rear portion of an automobile having the invention applied thereto, Figure 2 is a diagrammatic plan view of the invention, Figure 3 is a transverse sectional view through one of the sand boxes, Figure 4 is a sectional view taken on the line 4—4 of Figure 3, Figure 5 is a sectional view taken on the line 5—5 of Figure 3, and Figure 6 is a diagrammatic view of the boxes operated by a hand lever.

There is shown at 10 an automobile to which this improved sanding device has been applied, the automobile having the usual wheels 11 and 12 and the usual chassis members 13 and 14 between which is mounted the shaft 15 on which is secured the brake pedal 16 for operating the usual brake in the usual manner against spring 17 secured to a support 18. All of the foregoing parts or their equivalents are found on every automobile and claim no specific part of this invention.

In order to mount this invention on the automobile a pair of transverse bars 19 and 20 are mounted on the chassis 13 and 14 just forward of the wheels 11 and 12, and another pair of longitudinal bars 21 and 22 are mounted between the transverse bars 19 and 20 thus providing with the chassis members 13 and 14 two frames for mounting each of the sanding devices for each of the wheels included in this invention.

The sanding device for each wheel is identical and therefore the description of one of the sanding devices will indicate how both of the sanding devices are constructed and operated.

Each sanding device includes a rectangular box 23 to which is hinged a cover 24 as at 25 so as to allow a fresh supply of sand to be placed therein, preferably through a suitable opening provided in the floor of the automobile. The box 23 is provided with a grate-like bottom 26 and beneath the grate-like bottom 26 there is a discharge tube 27 leading to one side so as to extend below the chassis member 13 or 14 and discharge rearwardly beneath the automobile tire or wheel 11 or 12 as shown in Figures 1 and 2.

To assist in holding the discharge chute 27 in proper position a supporting strap member 28 is secured to the bottom of the automobile running board. As will be apparent, the chute 27 extends downwardly, sidewardly and rearwardly so as to conduct sand discharged through the grated bottom 26 of the box 23 to just below and forward of the automobile tires 11 and 12.

A grated sliding plate 29 is provided in the box 23 just above the grated bottom 26. This sliding plate 29 is normally secured by means of springs 30 extending between a pair of arms 31 secured to the sides of the box 23 and a pair of fingers 32 secured to the sliding plate 29 so as to hold the opening through the sliding plate 29 out of register with the opening through the grated bottom 26, thus closing the bottom of the box 23.

A hollow pan member 33 within the box 23 causes the sand in the box to more easily discharge through the openings in the sliding plate 29 when they have been brought into registration with the openings of the grated bottom 26 by moving the sliding plate 29 against the tension of springs 30. This movement is caused by means of a connecting rod 34 secured at one end to a finger 35 extending from the sliding plate 29 and adapted to be secured at its other end by means of a removable pin 36 to a pair of bosses 37 formed on the brake shaft 15. This connecting rod 34 is Y-shaped as shown so that the sliding plate 29 of each box 23 may be operated simultaneously.

Each box 23 is secured to its frame by means of steel strap members 38 and 39 extending between the box 23 and the transverse and longitudinal bars and chassis members in the same manner that the battery box of the automobile is usually secured. During dry weather when the sanding device may be unnecessary the pin 36 is removed through an appropriate opening in the floor board of the automobile disconnecting the connecting rod 34 from the brake shaft 15 whereby operation of the brake pedal 16 allows the sanding device to remain inoperative. Whenever the roads are apt to be skiddy, however, as during rainy or snowy weather or when there is ice on the road, the pin 36 is restored to its proper position securing the connecting rod 34 to the brake shaft 13, the sand boxes 23 being full of sand and ready for operation.

Thereafter, they are so connected whenever the brake pedal 16 is depressed to operate the brake in the usual manner, the connecting rod 34 will be drawn forward, drawing the sliding plate 29 forward against their springs 30 and bringing the openings in the plate 29 into registration with the openings in the grated bottom 26.

The presence of the chute 33 insures that no sand shall fall forward of the edges of the sliding plate 29 and interfere with its operation. The sand falling through the registered openings of the plate 29 and grated bottom 26 falls into the chute 27 which conducts it downwardly, sidewardly and rearwardly so as to discharge the sand just below the automobile tires 11 and 12.

Instead of securing the connecting rod 34 for operation by the brake pedal 16 it may instead be secured by means of a connecting rod 40 as shown in Figure 6 for operation by the hand brake lever 41. When so connected the sand will be discharged every time the emergency hand brake lever 41 is operated, so that if the car starts to skid, the automobile driver by operating the hand lever 41 can discharge sand beneath the rear wheels and immediately regain control of the car.

The hand lever 41 may either be the same lever for operating the emergency brake, or if desired may be a separate lever for operating the sanding device alone. When the sand or grit in the box 23 is exhausted it may be easily refilled through the cover 24 from any suitable source of supply, it being intended that gasoline stations should carry supplies of sand or grit in the same manner that they supply air, water, and other services for the automobile.

The novel features and the operation of this device will be apparent from the foregoing description. While the device has been shown and the structure described in detail, it is obvious that this is not to be considered limited to the exact form disclosed and that changes may be made therein within the scope of what is claimed without departing from the spirit of the invention.

Having thus set forth and disclosed the nature of this invention, what is claimed is:

An automobile sanding device including a box adapted to be secured to the chassis of the automobile, a grated bottom on said box, a shallow pan member within said box, said pan member having a wide discharge opening, a grated sliding plate between said shallow pan member and said grated bottom, said pan discharge opening being substantially co-extensive with said grated bottom, means for bringing the openings in said grated sliding plate and said grated bottom into registration, said grated plate having a pair of spaced fingers extending through said box, spring means secured to each of said fingers for holding the plate with its openings out of registration with said grated bottom, a chute extending from the bottom of said box downwardly, sidewardly and rearwardly to discharge the contents of the box beneath a wheel of the automobile, there being a separate sand box for each rear wheel of the automobile, a means for operating the sliding plate being connected to the sliding plate of each box, and including a Y-shaped common connecting rod for operating the same, said operating means being securable to a hand lever.

JOSEPH S. FEINS.